United States Patent [19]

Miller

[11] 4,385,624
[45] May 31, 1983

[54] SOLAR COLLECTOR

[76] Inventor: Richard L. Miller, 233 Broadway, Ste. 3612, New York, N.Y. 10007

[21] Appl. No.: 273,435

[22] Filed: Jun. 15, 1981

[51] Int. Cl.³ .............................................. F24J 3/02
[52] U.S. Cl. .................................. 126/416; 126/442; 126/450
[58] Field of Search ............... 126/415, 416, 422, 420, 126/448, 443, 450, 442

[56] References Cited

U.S. PATENT DOCUMENTS

| | | | |
|---|---|---|---|
| 3,299,881 | 1/1967 | Koch | 126/416 |
| 3,599,626 | 8/1971 | Bouse | 126/416 |
| 4,083,358 | 4/1978 | Scott | 126/448 |
| 4,187,832 | 2/1980 | Tregoning | 126/443 |
| 4,269,167 | 5/1981 | Embree | 126/420 |

Primary Examiner—James C. Yeung
Attorney, Agent, or Firm—Richard L. Miller

[57] ABSTRACT

A solar energy water heating unit is provided which heats water from a swimming pool by passing the water through a series of spiral hoses mounted on a supporting surface. The supporting surface is mounted on a platform raised from the ground and is cone-shaped to allow for at least a portion of each hose line to be exposed to the sun at all times of the day. The spiral hose lines are mounted in spiral grooves provided on the supporting surface. A pump pumps the water from the swimming pool to the inlet of the hose lines, which inlet is adjacent the lowermost edge of the supporting surface so that the water is always pumped upwardly to the outlet end of the hose lines adjacent the apex of the supporting surface.

6 Claims, 3 Drawing Figures

SOLAR COLLECTOR

BACKGROUND OF THE INVENTION

The present invention is directed to a solar energy water heating unit used preferably for heating water from a swimming pool. It is well-known that solar energy may be used to heat water to thereby provide a source of hot water, but all such devices presently known and used are costly to produce and prone to inoperativeness due to dependence on very sunny days.

SUMMARY OF THE INVENTION

It is the primary object of the present invention to provide a solar energy water heating unit that will heat water from a swimming pool, and the like, in such a way as to assure that such water is heated at any time of day.

It is another object of the present invention to provide such a device which is simple to produce and inexpensive to manufacture, and which may be readily assembled at its place of use in an easy manner.

It is still another object of the present invention to provide for the use of conventional black sprinkler hose lines in the construction of the device, which hose lines are used in the present invention for pumping water therethrough in full exposure to the sun.

The solar energy water heating unit of the present invention is provided with a stationary platform which rests upon the ground, as the back yard of a home which has a swimming pool. The platform is raised above the ground and supports thereon a supporting surface having a plurality of spiral grooves in which are mounted the black sprinkler hose lines.

The supporting surface is cone-shaped and has an apex. The plurality of hose lines mounted within the spiral grooves have a first inlet end into which is pumped the water from the swimming pool. The inlet ends are positioned adjacent the lower edge of the supporting surface, while the outlet ends of the hose lines are positioned adjacent the apex, so that the water is always traveling upwardly while in the hose lines. As the water travels about the spiral loops, the sun heats the water therein. The cone-shaped configuration of the supporting surface allows for at least some portion of the hose lines to be facing toward the sun at any time of day.

In a modification of the invention, two sets of spiral grooves and hose lines are provided, with the spirals of the first set having loops spaced closer together than the loops of the second set. In this instance, the hose lines may be alternated between spirals in the first set to ones in the second set, or vice versa, in order to lengthen the heating time and traveling time of the water in the hose or to shorten such time, depending upon weather and climatic conditions.

BRIEF DESCRIPTION OF THE DRAWING FIGURES

The invention will be more readily understood with reference to the accompanying drawing, wherein FIG. 1 is a top view of the solar energy water heating device of the present invention;

DETAILED DESCRIPTION OF THE PREFERRED EMBODIMENT

Figure 2:
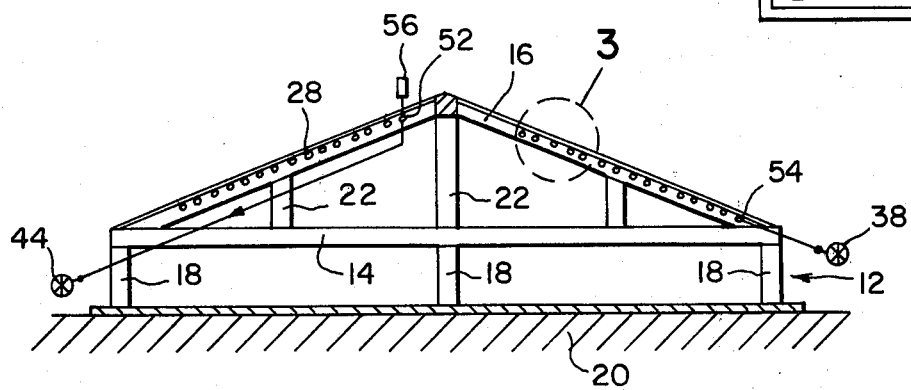
FIG. 2 is a side cross sectional view taken along line 2—2 of FIG. 1.

Referring now to the drawings, the solar energy water heating unit of the present invention is generally indicated by reference numeral 10. The unit 10 is comprised of a supporting frame 12, which frame has a platform portion 14 and a top supporting surface 16. The platform 14 has a plurality of legs 18, in the conventional fashion, for positioning upon a stationary ground 20, such as cement or concrete. The supporting surface 16 is cone-shaped, as can be seen in FIG. 2, and is buttressed by a plurality of vertical beams 22 which extend from the platform 14 upwardly to the cone-supporting surface 16. Preferably, the beams 22 extend along the center of the platform 14 and connect to the supporting surface 16 along a diameter thereof.

Figure 1:
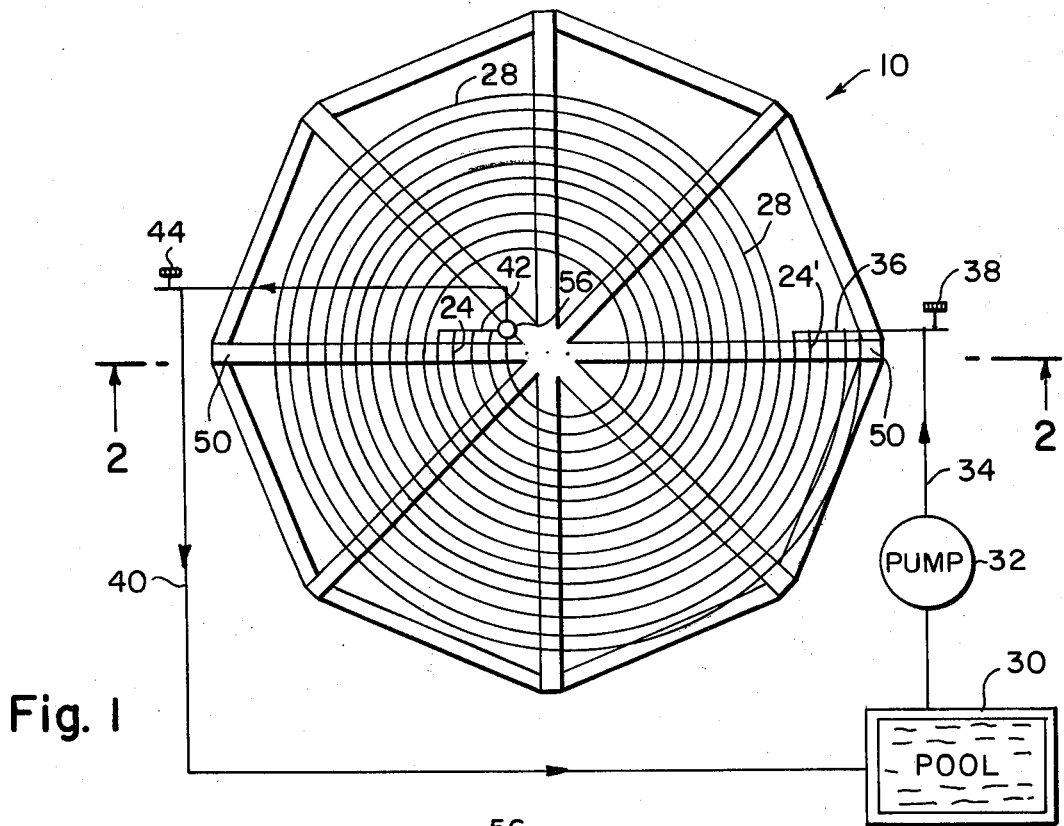

Formed on the top of the supporting surface 16 are a plurality of spiral grooves 24. In FIG. 1, there are five such spiral grooves, with each starting adjacent the center or apex of the supporting surface and terminating at an edge thereof, indicated by reference numeral 24'. Each spiral groove 24 mounts therein a hose 28, one hose for each sprial groove, so that when there are five such grooves, five such hoses are provided. The first end of each hose is positioned at the end 24' of the spiral groove, and serves as the inlet end through which is provided water from a source of water, such as a swimming pool 30, which water is to be heated. The water is pumped upwardly from the inlet end to the second outlet end of each hose adjacent the apex. A pump 32, of conventional design, may be employed to pump the water from the swimming pool 30 to the inlet ends of the hoses. A pipe 34 connects the pump to the inlet ends of the hoses by a manifold 36, which may be drained by a conventional valve 38, along with the spiral hose portion of the system.

A return flow pipe 40 is provided to return the heated water from the second outlet ends of the hoses to the swimming pool 30. The manifold 42 may be drained and vented by the valve 44.

Each hose 28 is typically ½ inch in diameter, and made of polyvinyl, colored black for greater absorption of sun rays. Typically, the platform 12 and supporting surface 16 are made octagonal at the lower planar edges thereof, as can be seen in FIG. 1, with a diameter of approximately 12 feet. The apex of the supporting surface typically extends 18 inches above the outer most perimetrical hose 54. An air bleeder valve 56 is installed at the apex or high point of the spiral or system to permit more rapid draining and filling.

It is noted that the pump 32 pumps the water uphill at all times, so that there will be no occurrence of air pockets or bubbles in the hose lines, which tend to decrease efficiency and operation. Further, the cone-shaped supporting surface 16 will, at all times of the day, be facing the sun, because the slope from the center to any edge thereof is small. As the water from the swimming pool travels along its spiral loop, the black surface of the hose will absorb the infrared heating rays of the sun and thus heat the water therein. The length of each hose path and the rate of pumping and removal of the heated water from the outlet of each hose can be adjusted to meet the specific requirements appertaining to the day in which it is being used. If it is discerned that a longer heating time will be required, as on a partly-cloudy day, the rate of flow through the hoses can be diminished by controlling the pump 32.

Figure 3:
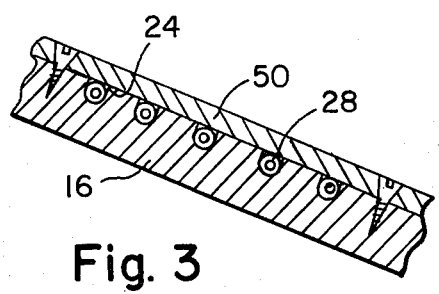
FIG. 3 is a detail view, in cross-section, of the cross beam of the present invention which holds the spiral hoses in their respective grooves.

It is, of course, feasible to provide any number of spiral grooves and hoses, the number five being only exemplary of the preferred embodiment. If a longer heating time is necessary for any given climate, then the spiral groove may be made with more loops. With a corresponding narrowing of the distance between each loop of the spiral or a larger diameter device, to thereby increase the length of travel of the water in the hose. Cross-beams covers 50, which are aligned along all the diameters of the supporting surface, cover off a portion of each spiral groove and holds the hose 28 in groove 24 of supporting surface 16 therein, as can be seen in FIG. 3.

It is also within the scope of the present invention to control the operation of the pump 32 by a thermostat, which senses the temperature of the water in the pool hose adjacent the inlet end thereof, so that when the temperature falls below a certain specified temperature, the pump will start up, and shut off again upon the reaching of the preset temperature.

While a specific embodiment of the invention has been shown and described, it is to be understood that numerous changes and modifications may be made therein without departing from the scope and spirit thereof.

It is to be further noted that in climates that require the system be drained during the winter to prevent freezing in cold weather that the spiral may be completely drained by opening valves 38 and 44 without the use of blowing air through this spiral to ensure that it is completely empty.

This complete draining occurs because all hose, piping, manifolds, etc. are pitched continually away from apex 52, and vent bleed valve 56.

What is claimed is:

1. A solar energy water heating device for swimming pools, comprising, in combination, a supporting frame resting upon a stationary surface; at least one hose means arranged in a spiral on said supporting frame; means for mounting said at least one hose means on said supporting frame; and fluid control means for supplying water to and from said at least one hose means, whereby water in the swimming pool, and the like may be heated, wherein said supporting frame comprises a supporting surface for said at least one hose means, said supporting surface sloping from the center thereof downwardly to an edge in all directions thereof, wherein said means for mounting said at least one hose means comprises at least one spiral groove in which is placed said at least one hose means, said at least one spiral groove having a first inlet end adjacent an edge of said supporting surface, and a second outlet end adjacent the center of said supporting surface, said at least one spiral groove extending upwardly along said supporting surface from said first inlet end to said second outlet end along the length thereof, wherein said fluid control means comprises a first inlet pipe having a first end in fluid communication with a source of water to be heated, and a second end in fluid communication with said first inlet end of said at least one hose means; a second outlet pipe having a first end in fluid communication with said source of water to return the water thereto after heating; and a second end in fluid communication with said second outlet end of said at least one hose means; and a pump for pumping water from the source of water through said first pipe means to said first inlet end of said at least one hose means, wherein said means for mounting said at least one hose means further comprises a cross-piece extending from one edge of said supporting surface to another edge of said supporting surface diametrically opposite, said cross-piece passing near the center of said supporting surface and covering a portion of said at least one spiral groove to hold said at least one hose means in said at least one spiral groove, wherein said supporting surface is cone-shaped having said center at its apex, said cross-piece comprising a first portion extending on one half of said cone-shaped supporting surface, and a second portion extending on the other half of said cone-shaped supporting surface, said first portion having a first end adjacent to said first inlet end of at least one hose means, and a second end adjacent said apex; and said second portion having a first end adjacent said apex; and said second portion having a first end adjacent an edge of said supporting surface diametrically opposed to said first end of said first portion, and a second end adjacent to said apex, said second end of said second portion lying near said second outlet end of said at least one hose means.

2. The solar energy water heating device according to claim 1, wherein said means for mounting said at least one hose means comprises at least one spiral groove formed in the top of said supporting frame.

3. The solar energy water heating device according to claim 2, comprising four said hose means, and four said spiral grooves, each said spiral groove being arranged on said top of said supporting frame in a parallel and coextensive manner.

4. The solar energy water heating device according to claim 1, comprising a plurality of said hose means and a plurality of said spiral grooves, each said spiral groove being parallel with and coextensive with the other of said spiral grooves.

5. The solar energy water heating device according to claim 1, wherein said supporting frame comprises a cone-shaped supporting surface, a platform upon which is mounted said cone-shaped supporting surface, and a plurality of vertical supporting beams for said supporting surface, each said supporting beam extending from said platform to said cone-shaped supporting surface.

6. The solar energy water heating device according to claim 1, wherein said means for mounting said at least one hose comprises a first set of spiral grooves formed in said supporting frame, and a second set of spiral grooves also formed in said supporting frame, the distance between corresponding portion of the loops of the spirals in said first set being shorter than the distance between corresponding portions of the loops in said second set.

* * * * *